Sept. 6, 1960 L. SCHINDLER 2,951,936

WIRELESS SIGNAL RECEIVER

Filed July 31, 1953

3 Sheets-Sheet 1

INVENTOR
LUDWIG SCHINDLER
BY Leon M. Strauss
AGT.

Sept. 6, 1960 L. SCHINDLER 2,951,936

WIRELESS SIGNAL RECEIVER

Filed July 31, 1953 3 Sheets-Sheet 2

INVENTOR
LUDWIG SCHINDLER
BY Leon M. Strauss
AGT.

Sept. 6, 1960 L. SCHINDLER 2,951,936

WIRELESS SIGNAL RECEIVER

Filed July 31, 1953 3 Sheets-Sheet 3

INVENTOR
LUDWIG SCHINDLER
BY Leon M. Strauss
AGT.

2,951,936
Patented Sept. 6, 1960

2,951,936

WIRELESS SIGNAL RECEIVER

Ludwig Schindler, 29 Zweibruckenstrasse, Forchheim, Upper Franconia, Germany

Filed July 31, 1953, Ser. No. 371,703
2 Claims. (Cl. 250—20)

This invention relates to multi-channel communication systems for wireless transmission of electric signals which may be voice or continuous wave (C.W.) signals such as Teletype or telegraphic impulses.

It is an object of the present invention to provide means affording improved communication systems having extremely stable operating characteristics which remain substantially unaffected by foreign interfering signals.

It is another object of the present invention to provide means leading to highly simplified yet very reliable communication systems wherein a plurality of identical message signals are both transmitted and received tending to greater accuracy and lesser possibility of garbling of the message.

It is still another object of the present invention to provide means conducive to novel and highly efficient communication systems enabling the strongest of a plurality of identical signals sent out from a transmitter and received by a receiver to be selected in the latter for transformation into an intelligible message.

It is a further object of the present invention to provide means facilitating the transmission of signals in electrical communication systems employing a high frequency carrier both with and without carrier suppression.

In the field of electrical communications, it has long been known that series of signals can be transmitted by a modulation of a high-frequency carrier in such a way that the latter is suppressed and only added at the receiving point in order to form the low frequencies. Arrangements are also known which utilize for the transmission of signals the harmonics that arise from the multiplication of a usually stable frequency produced by a quartz oscillator or similar arrangement.

The possibility of accumulating the transmitted signals has also been utilized, particularly in the transmission of Teletype impulses, and, finally, it is also known that several signal frequency channels can be employed simultaneously for the same communication with a view to ensuring greater reliability.

More specifically, the present invention, by way of example and not by way of limitation, refers to a communication system which combines these known principles with the new ones set forth below. The signal transmitter according to the invention, which can be employed in particular for the transmission of accumulated telegraphic signals by an alternating-current telegraph system, is characterized in that both in the transmitter and the receiver free-swinging, adjustable or variable oscillators are strongly controlled by a further oscillator generating a stable frequency which, though not adjustable, is identical for both transmitter and receiver.

As a result, the frequency spectrum of the adjustable oscillators produced by this controlling procedure only comprises integral multiples of said stable frequency. One of these multiples of the stable frequency serves at the receiving end as a beat frequency for the demodulation of the signal carrier frequencies and at the transmitting end as carrier for the modulating signal frequencies.

As a further refinement, it is to be noted that employing a push-pull modulator enables the transmitter to be operated with carrier suppression, so that the carrier frequency itself disappears and only the two resulting sidebands, each of which contains the same complete communication, are further amplified and transmitted.

These and other objects of the invention will become further apparent from the following detailed description, reference being made to the accompanying drawings, showing a preferred embodiment of the invention.

Figure 1:
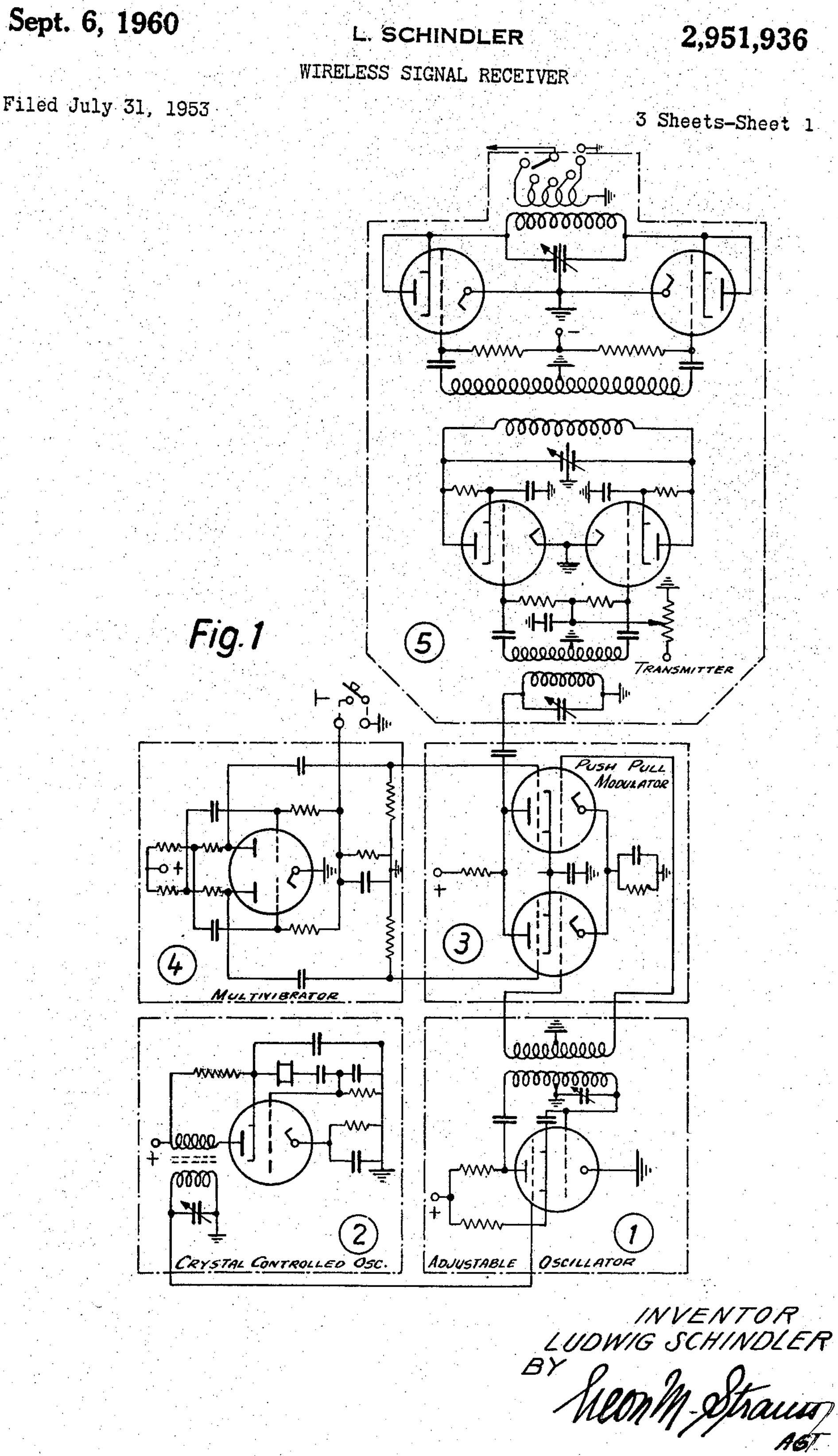
Fig. 1 is a circuit diagram for a transmitter of a communication system according to the invention.

Referring now more particularly to Fig. 1, the transmitter unit proper comprises a conventional adjustable oscillator 1 which can be adjusted over a wide range of frequencies. This oscillator is periodically excited by the output potential of a conventional crystal-controlled oscillator 2 generating a highly stable frequency $f_2$ in such a way that the oscillations $f_1$ of the oscillator 1 decay completely between successive building-up periods. (For practical reasons $f_2$ has a magnitude of about 120 kilocycles per second.)

This regulation of the fundamental frequency $f_1$ by means of the crystal-controlled frequency $f_2$ does not give rise to a spectrum $f_1 \pm nf_2$ but rather to a spectrum which only comprises the integral multiples of $f_2$. That is to say, oscillator 1 is constrained by the crystal frequency to produce oscillations which always coincide in time and phase with the crystal frequency. This results in series of damped oscillations of frequency $f_1$, whose onset is synchronized with the onset of oscillations $f_2$. In this way a frequency spectrum is obtained which only comprises integral multiples of the crystal frequency $f_2$ having maximum amplitude at the frequency $f_1$.

Consequently, strong harmonics of the crystal frequency $f_2$ are produced within the frequency range of oscillator 1.

In the conventional push-pull modulator 3, which is fed by the low-frequency potential of 1000 cycles per second derived, for instance, from a conventional multivibrator 4, each of the harmonics of the crystal frequency obtained in the manner described above is modulated, the crystal frequency itself being suppressed. This gives rise to two frequencies having or differing by an interval or spread of 2000 c.p.s. and symmetrical in relation to the position of the crystal harmonics. If the low-frequency modulation frequency is modified in unison with telegraphic signals, e.g. by switching the multivibrator from 1000 to 1500 c.p.s. by means of key T, two pairs of frequencies containing the communication appear symmetrically with respect to the harmonics of the crystal frequency.

The group of frequencies, which according to the frequency $f_1$ of oscillator 1 is associated with the crystal harmonic having the greatest amplitude, is selectively amplified and transmitted in the conventional successive transmitter amplifier stages 5. This selective amplification frees the desired group of frequencies from those separated from it by multiples of the crystal frequency.

It is to be noted that when oscillator 2 is disconnected from oscillator 1, as by suitable switch means (not shown), the above-described transmitter can also be employed like an ordinary transmitter with carrier suppression.

Figure 2:
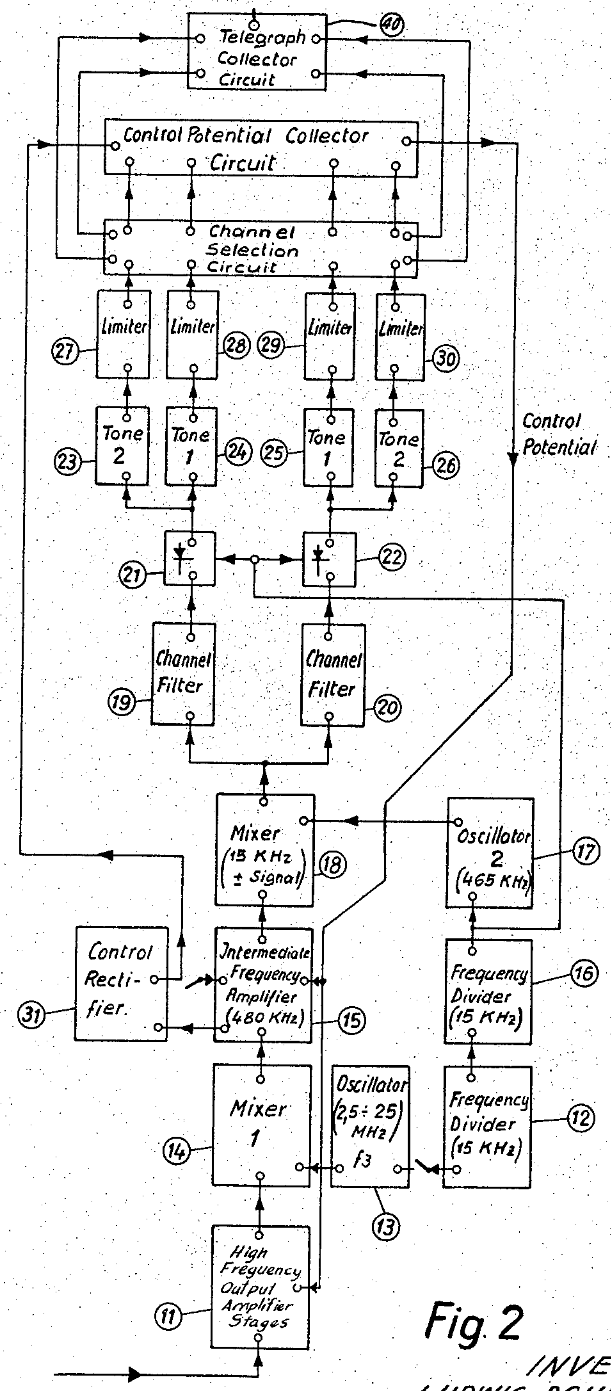
Fig. 2 is a schematic circuit diagram for a receiver of a communication system embodying the invention.

Considering now the receiver as shown in Fig. 2, the required auxiliary frequencies, and in particular the carrier to be added, are obtained from a quartz or crystal controlled oscillator substantially identical with oscillator 2 of the transmitter by means of suitable frequency change means such as multiplying and dividing circuits. Moreover, each sideband is separately demodulated with the supplementary carrier. The receiver has further a very small degree of distortion because non-linear circuit elements are avoided in all stages preceding the limiter circuit at the end of the alternating-current path.

The receiver (Fig. 2) consists, first of all, of a number of radio- or high-frequency input amplifier stages 11. A quartz or crystal controlled oscillator or like source of a stable frequency 12 with the same frequency as oscillator 2 of the transmitter, e.g. 120 kc.p.s., so strongly excites and suppresses a free oscillator 13 of frequency $f_3$, as in the transmitter, that only the integral multiples of the quartz frequency, with maximum amplitude at $f_3$, are produced. Oscillator 13 is so adjusted that the transmitter frequency, e.g. 9.6 megacycles per second ±1000 or 1500 c.p.s., when mixed in first mixer means 14 with the oscillator frequency, e.g. 9.12 mc.p.s., gives precisely the intermediate frequency to which the first intermediate frequency amplifier 15 is tuned. The latter operates on a bandwidth of about 3–6 kc.p.s., according to the magnitude of the low-frequency modulating frequency.

In order to ensure that the receiver can also be utilized with other types of transmitters, oscillator 12 can be cut off from free oscillator 13 by means of a switch 12', so that oscillator 13 can oscillate continuously on an adjustable frequency.

By means of frequency divider 16 a medium frequency, e.g. 15 kc.p.s. can be derived from oscillator 12, which medium frequency is later added as a lower frequency carrier. This latter frequency may be increased again by means of suitable frequency multiplying means, such as free oscillator 17, to obtain a spectrum of frequencies whose maximum value is so adjusted, e.g. at 465 kc.p.s., that second mixer stage 18 now produces two sidebands, e.g. 15 kc.p.s. ± the signal frequency. The two sidebands in this frequency position are separated from each other by conventional channel filters 19 and 20.

The individual sidebands are fed from filters 19 and 20 to demodulators 21 and 22, respectively, wherein a frequency equal to that of said lower carrier, e.g. 15 kc.p.s. taken from frequency divider 16, is added. This results in two low-frequency spectra, for instance in two two-note telegraphy tones or signals, e.g. 1000 and 1500 c.p.s. as assumed above, which are sifted or separated into four channels in filters or other suitable signal selection means 23, 24, 25, and 26 and led therefrom to four limiter circuits 27, 28, 29, and 30. These limiters constitute the first non-linear circuit elements or members employed in the amplification process and produce, independently of the magnitude of the above mentioned telegraphy frequency voltages (which can be seen to be in the audio range), constant output currents that can be employed to control a telegraph collector circuit or collector relay 40.

The utilization of identical crystal-controlled frequency generators for the transmitter and the receiver offers a very wide choice of most precise working frequencies and permits of accurately adjusting the receiver even before transmission begins.

At the input side of the limiters 27–30 there arise control potentials corresponding to the amplitudes of the frequencies received via the different channels. According to Fig. 3, whichever is the strongest of these control potentials acts on the resistance 50 through rectifiers 45, 46, 47, and 48, constituting a control potential collector circuit, and the voltage drop across said resistance is fed back to and thus determines the regulation of high-frequency stages 11 and first intermediate-frequency amplifier 15.

Figure 3:
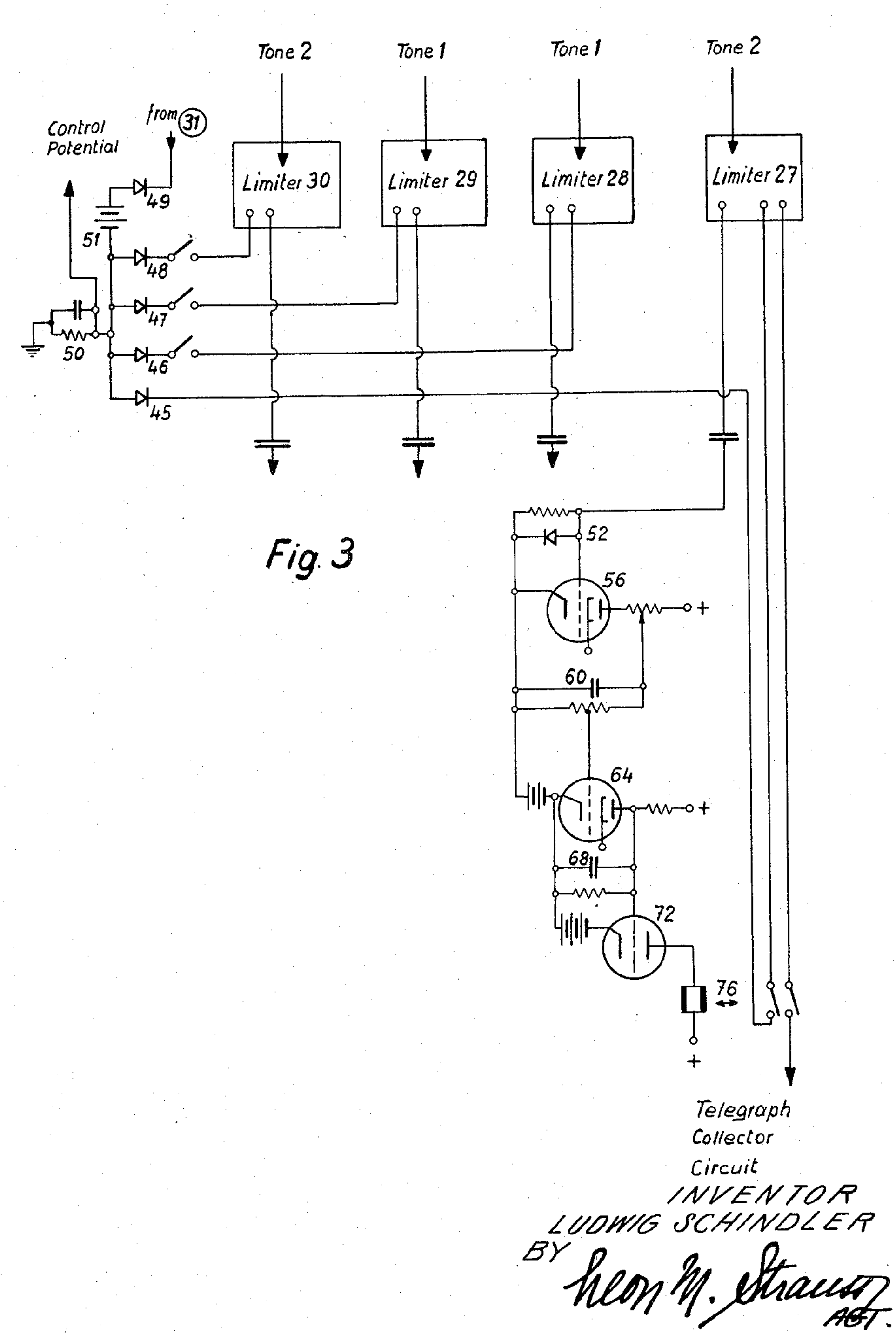
Fig. 3 is a schematic circuit diagram illustrating the control and interference suppressing aspects of the receiver of Fig. 2.

Furthermore, in order to prevent the receiver from being overloaded beyond its limits of linearity by a strong interfering station, a control potential is derived by means of a control rectifier 31 from the total energy contained in first intermediate-frequency amplifier 15, which potential also acts through rectifier 49 on the peak or control potential collector circuit, as may be seen in Figs. 2 and 3. Such action is, however, delayed, i.e., it occurs only when the magnitude of the control potential exceeds the value of the bias potential 51. When this happens the total amplification of the receiver is reduced for as long as the strong interfering signal is present.

Since each of the four channels contains the communication in positive or negative signals, the transmission can, in general, be protected against interferences and fading by providing each sound channel with a special recording instrument. However, this condition cannot be practicably realized, so that an effort must be made to obtain a perfect record, even with a single recording instrument, by a selective cutting out of the faulty channels.

It is relatively easy to obviate the message distorting or interrupting effects of channels subject to temporary fading, and means of suppressing background noises in such channels are known. A residual current can be left in a suitable collector relay or corresponding arrangement, which current prevents the relay, when, for instance, only one channel provides the marking current, from remaining permanently connected with the marking current.

Cutting out of those channels rendered useless by interfering radio signals becomes possible due to the fact that the interfering signals usually give rise to current impulses which are longer than those occurring with undisturbed signal transmission and particularly with uninterrupted accumulator working. Telegraphic alphabets with abbreviated signals could also be devised or so composed that no impulses longer than about 20 msecs. occur.

Interferences are accompanied, in general, by longer continuous impulses. If the duration of these impulses is measured continuously, separation of the faulty channel from the telegraph collector circuit and, since the channel then becomes worthless, from the control potential generator as well, can be made dependent on the appearance of over-long impulses.

This occurs, for instance, in the following way, as indicated in Fig. 3 for one channel. An alternating, low frequency potential, which, in the above set forth example, is in the audio range, is taken from limiter 27 and rectified in rectifier 52. The resulting direct-current impulses corresponding to the telegraphic signals are led to the amplifier tube 56 with such polarity that this tube is locked, i.e., becomes non-conducting, for the duration of said impulses. The charge and discharge time constants of capacitor 60 connected with the plate circuit of this tube are so selected that tube 64 is rendered conductive by overlong continuous impulses. This causes the potential at the grid of tube 72 to drop, deenergizing relay 76 connected with the plate circuit of the latter tube and cutting off the temporarily faulty channel from the telegraph collector circuit and the control potential collector circuit. The charge time constant of capacitor 68 is so chosen that this condition of the channel is maintained even when the interfering signals are not continuous but are frequently repeated.

In résumé, therefore, the operation of the system is as follows. A signal whose frequency alternates between 1000 c.p.s. and 1500 c.p.s., depending on whether key T is depressed or not, is imposed on a 9.6 megacycle carrier and combined therewith to produce side-bands having respective frequencies of the carrier plus or minus the signal frequency. This is mixed with a 9.12 megacycle frequency in the receiver reducing the carrier frequency to an intermediate frequency of 480 kilocycles, the side-bands being retained, of course.

The latter is now mixed with a frequency of 465 kilocycles to reduce the carrier frequency to a lower value of 15 kilocycles. The sum and difference side-bands are then separated, and each is mixed (at 21 and 22) with a frequency of 15 kilocycles, producing in each channel the originally applied signals.

Since the frequency of each of these signals alternates between 1000 and 1500 cycles, each of said channels can be split up into two further channels, each of the latter being tuned to one or the other of said signal frequencies (which may be considered as being 1000 and 1500 cycle tones). These are then transmitted to any suitable means for transformation into an intelligible message.

Should fading or interference occur in any one or more of the channels, each of which carries a duplicate of the message, such channel or channels will be cut out by the control parts of the system, leaving in operation only that channel carrying an uninterrupted message.

The above described embodiment of the invention is, of course, subject to many modifications, the nature of which will be readily apparent to those skilled in the art, but which nevertheless form a part of this invention as defined in the appended claims. Thus, for example, any suitable frequency-stabilized oscillator means may be employed in lieu of the combined crystal-controlled oscillators 2 and 12 and variable oscillators 1 and 13, and the multivibrator may be replaced by any desired signal oscillator.

Again, although the system has been described as used for transmitting telegraph signals, it will be readily seen that it is adapted for the transmission of other types of signals, including voice or speech. Likewise, the means for transforming said signals back into an intelligible message may be a pen and paper, a Teletype machine, a suitable loudspeaker system, or even an optical system, depending on the manner of signal identification desired.

Having thus described the invention, what is claimed as new and desired to be secured by Letters Patent, is:

1. A receiver for a transmitted signal of a selected frequency and predetermined side bands, comprising frequency-stabilized oscillator means generating a frequency which is an integral multiple of the frequency of said transmitted signal, high-frequency amplifier means at the input of said receiver for amplifying said transmitted signal and its side bands, first mixer means operatively connected to said frequency-stabilized oscillator means and said high-frequency amplifier means to reduce said transmitted signal frequency to a first intermediate carrier frequency with said predetermined side bands, means for generating a second intermediate frequency differing from said first intermediate frequency, second mixer means operatively connected to said last-named generating means and to said first mixer means for reducing said first intermediate carrier frequency to a substantially lower carrier frequency with said predetermined side bands, channel filter means connected to said second mixer means for selectively separating said side bands while retaining the same on said lower carrier frequency, modulator means for obtaining a generated lower frequency substantially equal to said lower carrier frequency, said modulator means being connected to said channel filter means to demodulate said lower carrier frequency so that only said relatively low frequency signals derived from said modulator means and constituted by said predetermined side bands remain, channel circuit means including signal selection means operatively connected to the output of said channel filter means for separating said relatively low frequency signals from one another into individual channels, respective limiter means connected to the outputs of said signal selection means and operable to cut out all of said relatively low frequency signals except the strongest signal, means for transforming said strongest signal into an intelligible message, said last-named means being operatively connected to the outputs of all of said limiter means and responding to operation of that one of said limiter means carrying said strongest signal, intermediate frequency amplifier means connected between said first and said second mixer means to amplify said first intermediate carrier frequency, said limiter means including non-linearly operating circuit elements, and control potential circuit means having one part operatively connected to said limiter means, respectively, to said intermediate frequency amplifier means, and to said high-frequency amplifier means, whereby control potentials may be taken from said limiter means and applied to said intermediate frequency amplifier means and to said high frequency amplifier means to reduce distortion of said signals by fading phenomena.

2. A system according to claim 1, said control potential circuit means also including a source of bias voltage operatively connected between said intermediate frequency amplifier means and said limiter means, said bias voltage normally tending to prevent interference by undesired signals, a part of the energy of said first intermediate frequency carrier being employed as a further control potential and applied in bucking relationship to said bias voltage, and means actuated by excess of said further control potential over said bias voltage, due to excessively strong interfering signals present in said intermediate frequency amplifier means, for cutting out any affected channel to prevent overloading thereof by said interfering signals.

References Cited in the file of this patent

UNITED STATES PATENTS

| | | |
|---|---|---|
| 1,717,062 | Phelps | June 11, 1929 |
| 1,776,821 | Strieby | Sept. 30, 1930 |
| 2,066,047 | Mathes | Dec. 29, 1936 |
| 2,253,832 | Whitaker | Aug. 26, 1941 |

FOREIGN PATENTS

| | | |
|---|---|---|
| 138,218 | Australia | June 26, 1947 |

OTHER REFERENCES

"Electronic and Radio Engineering," by F. E. Terman, fourth ed., page 953; published by McGraw-Hill Book Co., Inc., 1955.